United States Patent [19]

Haase

[11] 4,408,420

[45] Oct. 11, 1983

[54] DOUBLE WALLED UNDERGROUND STORAGE CONTAINERS FOR FLUIDS SUCH AS HEATING OIL WHICH ENDANGER THE GROUND WATER AND A METHOD FOR THEIR MANUFACTURE

[76] Inventor: Harry Haase, Gadelander Str. 172, 2350 Neumünster 1, Fed. Rep. of Germany

[21] Appl. No.: 752,842

[22] Filed: Dec. 21, 1976

[30] Foreign Application Priority Data

Dec. 24, 1975 [DE] Fed. Rep. of Germany ..... 25587375

[51] Int. Cl.³ .............................................. E04B 1/32
[52] U.S. Cl. .......................................... 52/1; 52/169.7; 52/249; 52/DIG. 7; 52/309.15; 52/309.17
[58] Field of Search ............ 52/80, 82, DIG. 7, 309.3, 52/309.1, 309.17, 249, 169.6, 1, 169.7, 309.15; 61/0.5; 428/446, 538; 73/73, 74

[56] References Cited

U.S. PATENT DOCUMENTS

| 2,413,243 | 12/1946 | Neff | 52/80 |
| 2,801,538 | 8/1957 | Matson | 73/73 |
| 2,850,890 | 9/1958 | Rubenstein | 52/612 X |
| 3,145,502 | 8/1964 | Rubenstein | 52/223 R |
| 3,150,032 | 9/1964 | Rubenstein | 52/DIG. 7 |
| 3,238,231 | 6/1967 | Sergovic | 52/309.17 |
| 3,239,479 | 3/1966 | Roenicke et al. | 52/309.17 |
| 3,317,189 | 5/1967 | Rubenstein | 52/309.17 |
| 3,365,936 | 1/1968 | Hubin et al. | 73/73 |
| 3,679,568 | 7/1972 | Westerlund | 52/309.17 |
| 3,742,985 | 7/1973 | Rubenstein | 52/309.17 |
| 3,753,849 | 8/1973 | Duff | 428/446 |
| 3,922,413 | 11/1975 | Reineman | 428/538 |
| 3,926,143 | 12/1975 | Hothan | 73/73 X |

FOREIGN PATENT DOCUMENTS

| 1985588 | 2/1968 | Fed. Rep. of Germany | 52/309.9 |
| 1272830 | 2/1969 | Fed. Rep. of Germany | 52/309.15 |
| 1939150 | 7/1969 | Fed. Rep. of Germany | 52/309.17 |
| 2101515 | 3/1972 | France | 52/309.17 |
| 372709 | 5/1932 | United Kingdom | 52/169.14 |

Primary Examiner—Kenneth Dorner
Attorney, Agent, or Firm—Saul Jecies

[57] ABSTRACT

Underground storage tank for fluids which has an inner and an outer wall of thermosetting reinforced plastics material and a leak monitoring space between these walls, said space comprising a continuous air and liquid permeable synthetic concrete mixture of a thermosetting resin and compression resistant filling material having no small components, the concrete forming the static load bearing layer of the tank, the dosing of the synthetic resin being such that a sufficient wetting of the surfaces of the filling material particles is achieved for the bonding of the filling material particles with one another while securing the continuous leak monitoring space, and the synthetic resin concrete layer being firmly bonded to the thermosetting plastic of the inner wall and the outer so as to form a homogeneous unit.

13 Claims, 3 Drawing Figures

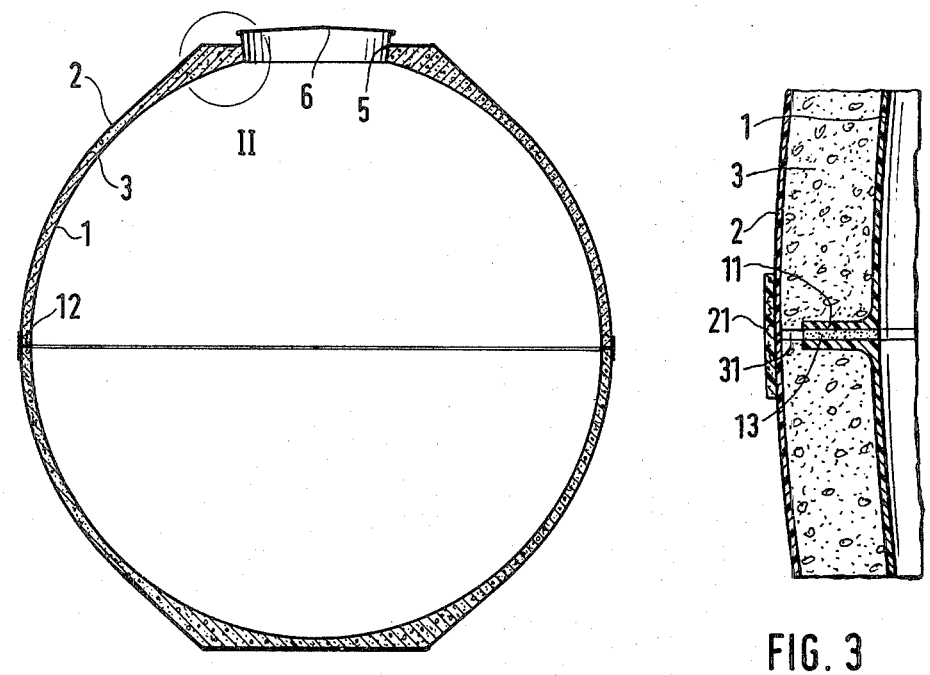
FIG. 1
FIG. 3
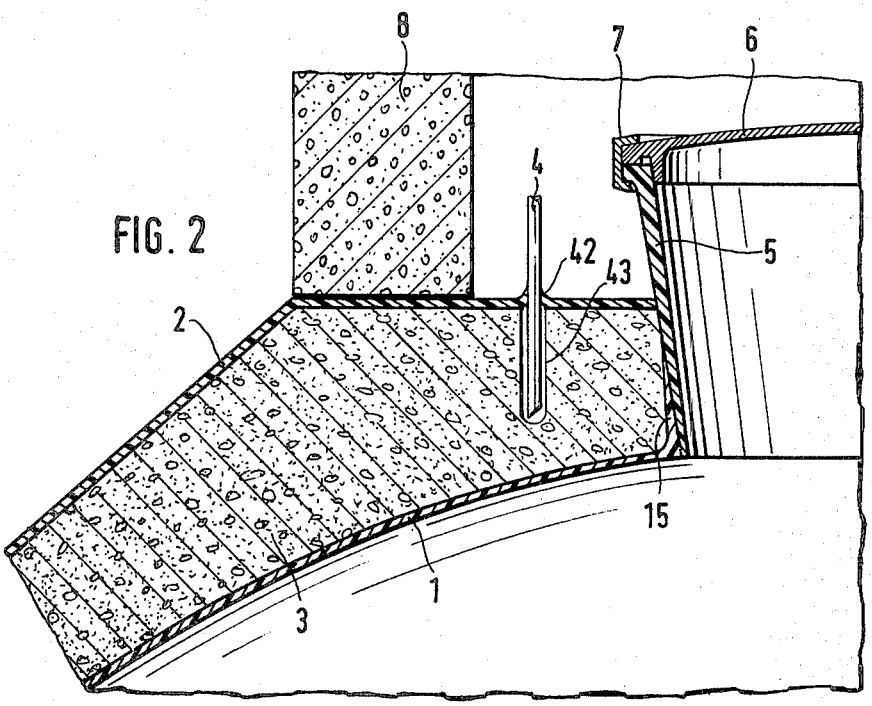
FIG. 2

DOUBLE WALLED UNDERGROUND STORAGE CONTAINERS FOR FLUIDS SUCH AS HEATING OIL WHICH ENDANGER THE GROUND WATER AND A METHOD FOR THEIR MANUFACTURE

BACKGROUND OF THE INVENTION

1. Field of Invention

The invention relates to double walled underground storage containers or tanks for fluids such as heating oil which endanger the ground water, having an inner and outer wall which preferably comprise a thermosetting plastics material, advantageously glass fiber reinforced plastic, and a leak monitoring space situated between these two which is filled with a continuous air and liquid permeable material bracing the inner wall against the outer wall.

2. Description of Prior Art

In a known heating oil container of this type (German Gebrauchsmuster No. 1 985 588) the leak monitoring space comprises an intermediate layer of porous open-pored foamed material. By producing the double wall with an intermediate layer in a single process one achieves a unitary container body which, however, may not be heavily loaded and which may not be termed a static, or in any way substantial, load bearing unit because the forces acting on the outer or inner walls cause a yielding and compression of the foamed layer so that, on the one hand, the inner and outer walls undergo a different deformation and must be correspondingly dimensioned, whilst on the other hand the permeability of the leak monitoring space and thus its whole function is impaired.

Double walled containers are known (German Patent Specification No. 1 272 830) for the purpose of achieving a satisfactory resistance against forces acting on the storage container from the outside in which the outer wall comprises steel and the inner wall comprises glass fibre reinforced polyester resin. In order to fix the geometrical shape of the inner wall and to achieve a uniform intermediate space the space is filled with a strengthening filling material in the form of a granular, preferably spherical, material provided with an adhesive so as to maintain the porosity of the intermediate space. In such containers substantially all those forces acting from the outside are taken by the outer wall which must be correspondingly strongly dimensioned, whilst when the dimensions are not correct the filling material braces the inner wall when in the empty state, but does not prevent a change of position of the latter upon loading.

Furthermore it is known in connection with heating oil containers with a double glass fiber reinforced plastic wall (German Offenlegungsschrift No. 1 939 150), to fill the intermediate space between the inner and outer walls with impermeable cast concrete or rigid polyurethane foam. Such containers exhibit good static properties, however the required wall strengths are too great. Above all, however, they cannot be employed in those areas in which leak monitoring is necessary as a consequence of particular ground water protection installations. However, because of their three-layered construction which permits of no leak control between the inner and outer walls such containers are classed by the authorities with the single walled containers.

Finally, a storage container of synthetic resin concrete in known (French Patent Specification No. 2 101 515), the inside of which is provided with a layer of synthetic resin so as to achieve the required seal and on its outside is given a coating of glass fiber reinforced plastic so as to achieve adequate mechanical strength. The synthetic resin concrete layer is not fluid tight so the above mentioned inner seal has to be provided. However, this plastic concrete layer may neither be regarded nor is it suitable as a leak monitoring space in any way since the mentioned permeability is merely such as also occurs in normal concrete. For these known containers expanded clay is suggested as the filling material which, as desired, leads to a considerable reduction in weight of the whole container. However, the expanded clay results in a closed pore structure and not a continuous leak monitoring space. On the other hand when using expanded clay one cannot do without completely filling the space remaining within the filling material structure because otherwise the strength would be insufficient for a container which is to be used underground.

3. Object of Invention

The main object of the invention to produce a storage container having two plastics walls taking up tension, compression and transverse forces which at the same time enables leaks to be monitored whilst avoiding the disadvantages of the known storage containers.

SUMMARY OF THE INVENTION

In accordance with the present invention this object is achieved by a storage container or tank of the above described type in which the leak monitoring space comprises a continuous air and liquid permeable synthetic concrete with a compression resistant structure of filling material having no fine or pulverulent components or particles and forms the static load bearing layer of the container, the dosing of the synthetic resin being such that a sufficient wetting of the surfaces of the filling material particles is achieved for the bonding of the filling material particles with one another whilst securing the continuous leak monitoring space, and the synthetic resin concrete layer being firmly bonded to the thermosetting plastic of the inner wall and the outer so as to form a homogeneous unit. The advantages achieved thereby reside in the fact that the storage container can take up all the forces which act on this type of underground tank and at the same time an efficient and continuous leak monitoring is possible so that this storage container may be used with particular advantage in those situations in which leak indication is prescribed by law, for instance in water protection areas. In contrast to the known glass fiber reinforced plastic containers having leak monitoring facilities the container in accordance with the invention forms a static load bearing unit and the leak monitoring is possible without the arrangement of the leak monitoring space necessitating an impairment of the statically effective structure. At the same time one only need use extremely low strength inner and outer walls which are merely of the order of a few millimeters, normally 2 to 4 mm, thus saving expensive glass fiber reinforced plastic material and reducing the total cost of the container. Due to the stability of the shape of the structural unit no special measures need to be taken when installing the tank and filling the pit south of the equator. On the other hand, due to the compression resistant structure of the filling material, which in accordance with a preferred embodiment of the invention should consist of gravel, it will be ensured that the container itself is sufficiently heavy to be able to satisfactorily stand up to lifting forces which may occur when the container is partially or completely emptied.

The composition of the synthetic resin concrete should be chosen, that is to say the choice of the critical factors such as type, and in particular, size of the filling material, type of resin to be used and its adjustment of regulation of the amounts of accelerator and hardener agents and the amount of resin used as a binding agent for filling material structure, should be made such that the continuous cavity of the leak monitoring space occupies between 10% and 45%, preferably between 20% to 30%, of the leak monitoring space between the inner and outer walls. These given ranges have shown themselves to be particularly suitable, for if the continuous cavity of the leak monitoring space is made too small the resistance to flow is too great and the effectiveness of the leak monitoring is impaired, whilst if the cavity occupies too great a fraction of the total leak monitoring space the strength of the static load bearing unit in accordance with the invention is drastically reduced. The exact quantitative proportions are determined substantially by the degree of compaction of the synthetic resin concrete mixture. In this connection it is critical that the resin binding agent wet the surfaces of the filling material thus promoting an intimate bond but also that it be not present in excess, so as to avoid deposition of resin and thus a narrowing of the required cavities, i.e. a deterioration of the leak monitoring function.

Preferably the synthetic resin concrete is in the form of polyester concrete, whilst the compression resistant filling material structure should comprise granular material without small, i.e. fine or pulverulent components of less than 1 mm. Polyester concrete has shown itself to be particularly advantageous due to its processing and strength properties, and leaving out small components of less than 1 mm means that one is ensured of sufficiently large continuous cavities without the danger of their being blocked by such small components. Technologically speaking, leaving out the small components of less than 1 mm means of gravel structure that can be produced in an industrial sifting process as the result of which, due to the required efficiency of the sifting process which otherwise would cause the filling material structure to be more expensive if the sifting process was to be more exact efficient, the remaining small components amount to less than 5% of the total. In a preferred construction of a storage container in accordance with the invention the filling material structure comprises gravel having a grain size of above 2 mm and the resin comprises an unsaturated polyester resin. As known from normal cement concrete, when used as a filling material, gravel has an excellent compressive strength. Gravel having a grain size over 2 mm is common in the trade and ensures a sufficient surface for the binding agent used. The unsaturated polyester resin may be particularly easily worked, especially with regard to the wet on wet processing when producing an intimate bond with the inner and outer walls.

In a further preferred embodiment of the invention the storage container in a known manner comprises at least two component shells including connecting flanges and means for sticking these together, in which the connecting flanges only partially extend into the leak monitoring space thus leaving a portion of the cross section of the latter unobstructed and ensuring that even adjacent the joint said spaces of the component shells are continuously connected. As an additional measure against leaks which may occur in the region of the joint a strengthening strip may be firmly secured to the wall of the free or unobstructed portion of the cross section of the leak monitoring space in the region of the line of the joint.

The invention is particularly suitable for storage containers having a double curvature, preferably of spherical shape, comprising at least two component shells or shell halves glued together at their joints. A connecting flange may be formed on each upper and lower portion of the inner and outer walls extending into the leak monitoring space. Each pair of connecting flanges leaves a portion of the cross section of the leak monitoring space unobstructed, and has adhesive between them. Such curved containers, which are nowadays mostly sold as spherical or nearly spherical containers, may be manufactured in accordance with the invention both economically and, more importantly, in accordance with the safety regulations.

In cases in which the storage containers are not composed of shell parts but are manufactured in one piece the inner and outer walls may preferably comprise rolled or wound laminated rovings, i.e. glass fiber roving layers soaked in polyester resin. Such one-piece, undivided tanks show the advantage of not having any throat or contraction of the free passage section in the region of joint but rather of having the synthetic resin concrete structure extend over the whole container wall in continuous, i.e. unobstructed thickness. The winding of the rovings may be performed fully mechanically so that no defects or delays as more frequent in manual manufacture should occur. Also, such glass fiber reinforced plastic layers manufactured by using rovings result in extremely good resistance properties in the inner and/or outer walls.

According to yet another preferred embodiment of the invention there is provided for a storage container comprising at least two component shells, wherein each of said components comprises the glass fiber reinforced plastic inner wall, if necessary provided with one connecting flange each leaving unobstructed part of the cross section of the leak monitoring space, and the synthetic resin concrete layer, the component shells being covered in one piece by the outer wall comprising synthetic resin soaked glass fiber rovings. Such a container is particularly advantageous when compared with the one-piece tanks because it may be produced very economically due to the shell components which can be handled and manufactured more easily and quickly. Additionally such containers have the advantageous resistance properties of one-piece tanks due to the one-piece manufacture by winding rovings for the outer wall. The connecting flange extending into the joint area need only be relatively narrow since with the one-piece outer wall this joint is no longer as important as with a two-piece outer wall glued together. This also results in a wider passage cross section of the leak monitoring space in this area, i.e. this space is less obstructed by the flange so that the function of the leak monitoring space is guaranteed over almost the whole cross section of the leak monitoring space as would be the case with a one-piece container having a completely unobstructed synthetic resin concrete layer.

Furthermore the invention includes a method of making such a container is which the inner wall of glass fibre laminate is applied onto a core by manual laminating, fiber spraying or winding and, after hardening and shrinking, a bonding resin layer is applied to its outer surface, a mould is positioned at a distance to the inner wall so as to define the cross section of the leak monitoring space, the intermediate space is filled with a synthetic resin concrete mixture comprising a compression resistant gravel structure and unsaturated polyester resin wetting the surface of the latter and bonding the grains, directly thereafter or during the gel-phase of the resin of the outer region of the resin concrete, the mould is removed and before the end of the gel-phase of the outer region of the resin concrete the outer wall of glass fiber reinforced plastic is put on.

After completion of the inner wall and positioning of the mould which determines the cross section of the leak monitoring space the manufacture continues preferably by filling the necessary quantity of the synthetic resin concrete mixture, mixed in the correct proportions, into the space immediately after a pre-accelerator has been added, the mould being removed and the outer wall of glass fiber reinforced plastic applied upon reaching a curing degree of between 90% to 95% in the outer region of the concrete layer. In other words the very moment the hardener comes into contact with the pre-accelerated resin the irreversible polymerisation process begins and the work must be done rapidly as soon as a degree of hardening or curing of 90% to 95% is reached, i.e. the resin has reached the gel-phase. Thus the work is carried out wet on wet, i.e. with components in an unset condition. By means of this method one can produce an intimate bond between the inner wall and the synthetic concrete on the one hand and between the synthetic concrete and the outer wall on the other hand, so that seen as a whole a homogeneous statically load bearing unit results.

In order to ensure the function of the monitoring space when manufacturing containers from component shells, after the shell components are completed they are glued together leaving an aperture in the glue joint. If necessary a laminate strengthening piece may be secured to the outer wall in the region of the butt joint.

In the production of one-piece containers a method is particularly advantageous in which the glass fiber rovings of the inner wall are applied to a divisible core by mechanical crosswinding and after filling of the synthetic concrete the outer wall is produced in a similar manner. One of the main advantages of this method is that the procedure may be performed continuously on a club-like, preferably over-mounted core. Also a rather firm and uniform structure of the inner and outer walls will be achieved by means of the resin-soaked rovings whilst the lifting forces resulting from the filled-in synthetic resin concrete mixture can be matched rather easily. Although this method is particularly advantageous for one-piece tanks it may also be applied for tanks assembled from component shells. In this case one should merely take special care in the formation of the butt joint.

Finally there is provided for a preferred method for the production of storage containers consisting of at least two component shells including the inner wall and the synthetic concrete structure and covered by a one-piece outer wall of resin-soaked glass fiber rovings. In this method the inner wall is produced from glass fiber laminate and a synthetic resin concrete mixture is applied to the latter after positioning a mould for defining the leak monitoring space, whereupon the component shells are firmly connected to one another and covered by the outer wall during the gel-phase of at least the outer region of the synthetic resin concrete mixture, and the other wall is produced by winding of the united component shells by means of synthetic resin-soaked, particularly polyester-soaked glass fiber rovings. This method is particularly economical in that it combines the easy handling of the component shells during the first steps and the firm connection of these components by the cross-winding of rovings.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings show:

FIG. 1 a section of a storage container.

FIG. 2 the portion marked II in FIG. 1.

FIG. 3 a butt joint of a storage container comprising two component halves.

DETAILED DESCRIPTION OF THE PREFERRED EMBODIMENTS

A storage container in accordance with the invention comprises substantially an inner wall 1 and an outer wall 2, both of glass fiber reinforced plastic and a space between the two forming a leak monitoring space 3 which is filled with air and liquid permeable polyester concrete. This polyester concrete comprises gravel of grain size class 2 to 8 mm and a thixotropic unsaturated polyester resin. In accordance with the usual commercial classification or sieving methods the mentioned grain size indicates that the constituents of less than 2 mm may only be present in a proportion of less than 5% of the entire amount. However, there are almost no upper classification limits for performing the invention since these are merely defined by the constructional circumstances, i.e. mainly the given dimensions.

The concrete mixture is prepared in a mixer and a pre-accelerator is added. The concrete mixture is then introduced into a mould which is defined by the inner wall 1 of glass fiber reinforced plastic which is made in a known manner and an outer shell which is not further described and substantially corresponds to subsequent outer wall 2. The introduction of the concrete takes place whilst the glass fiber reinforced plastic of the inner wall 1 has not completely set or cured, that is to say whilst an intimate bond is possible between the polyester resin of the concrete and the polyester of the inner wall. The work is therefore carried out wet on wet. Directly before the introduction of the polyester concrete mixture setting agents are added to it with the result that the irreversible polymerisation process immediately begins. This setting process occurs relatively quickly. When the outer layer has reached a curing degree of approximately 95%, i.e. when it is in the gel-phase, the outer shell is taken away and the outer wall 2, which also comprises glass fiber reinforced plastic, is brought into position in a known manner so that here also the work is carried out with the components in a wet on wet condition.

The amount of polyester resin is so measured in relation to that of the gravel that the surface of the gravel is completely wetted by the resin so that a firm and intimate connection is possible between neighbouring gravel particles and at the same time a sufficient and continuous cavity appears without the superfluous resin reducing the cross section of these cavities.

By applying the polyester concrete to the outer surface of the inner wall 1 in statu nascendi and applying the outer wall 2 onto the polyester concrete while the latter is in the gel-phase, the inner wall 1 and the outer wall 2 form together with the leak monitoring space 3 a statically effective sandwich section, an efficient leak monitoring being made possible by means of a leak indicator tube 4, which is situated in an aperture 43 in the polyester concrete and secured in position by means of a lip 42 in the outer wall 2.

FIG. 3 shows a butt joint 12 in a spherical underground container made from two shells. Connection flanges 11 are formed on the inner wall 1 of the upper and lower shell which extend into the leak monitoring space 3 but which only occupy a portion of the latter and so end a distance from the outer wall 2, and leave a part of the cross section of the leak monitoring space 3 unobstructed thus forming a satisfactory connection between the leak monitoring spaces in the upper and lower shells. A firm bond between the upper and lower shells is ensured by an adhesive material 13, comprising epoxy resin, between the two connecting flanges 11. In order to ensure a satisfactory lateral strength and seal, a fibre glass laminate reinforcing strip 21 is glued on.—If necessary, a foam plastics strip which does not impair the function of the leak monitoring space may be inserted in the unobstructed portion 31 of the leak monitoring space.

Instead of providing flanges 11 on the inner wall portions 1 it is, of course, also possible to provide corresponding connecting flanges on the outer wall, or to arrange connecting flanges on the inner and outer wall. It is, however, critical in each case that there is a connection between the leak monitoring spaces of the upper and lower shells over the entire periphery of the butt joint 12.

The opening of the container is formed in a known manner by an opening ring 5 which also comprises glass fiber reinforced plastic thus enabling a rigid homogeneous connection with the inner wall 1 and the outer wall 2 by means of glueing to flange like shoulders 15 on the inner wall 1 and/or outer wall 2. This opening is closed by a top 6 which is held firmly in place against the opening ring 5 by a clamping ring 7. Furthermore one recognizes the domed shaft 8 surrounding the opening and leading towards the surface.

When manufacturing glass fiber reinforced plastic whilst one can use any method best suited to the particular shape of the container. It is also possible either to spray the laminate or to wind the glass fibre reinforcement in the form of polyester-soaked rovings. This so-called crosswinding method is advantageously applied in the production of one-piece tanks. The winding of the inner wall is performed on a core composed of several components the core preferably being overmounted. Such a core in connection with its mounting shaft has a club-like shape. On the inner wall winding the further steps of the production are performed in the aforedescribed manner. After the complete curing of the storage container the core is separated into pieces and taken out of the container cavity.

Instead of the one-piece production by crosswinding using glass fiber rovings it is also possible to apply a combination of the component shell- and the one-piece-production by producing component shells comprising the inner wall and the sythetic resin concrete layer for the leak monitoring space applied onto the inner wall, connecting the component shells to one another and thereafter covering them by polyester resin soaked glass fiber rovings by means of crosswinding. According to the necessities and the possibilities the inner wall may be produced by conventional laminating methods, e.g. manual laminating or fiber spraying. In these procedures a connecting flange of more or less width may be formed to the inner wall. A wet on wet connection with the synthetic resin concrete is performed in the above described manner. After reaching an adequate curing degree both component shells are connected with each other, whereupon the outer wall is manufactured by crosswinding. Of course, this will be done within a period in which an intimate connection between the synthetic resin concrete and the material of the outer wall may be achieved, i.e. during the gel-phase of the outer layers of the synthetic resin concrete.

What is claimed is:

1. Double-walled underground storage container for fluids, such as heating oil, which upon leaking are capable of endangering the purity of the ground water, comprising an inner and a surrounding outer wall of synthetic plastic material which define with one another a gap forming a continuous leak monitoring space;

a body of open-pore material continuously permeable to air and liquid filling said gap and bracing the inner wall against the outer wall and forming with said walls a homogeneous unit capable of withstanding and absorbing tensile, compressive and torsional forces, said material being synthetic concrete with a compression-resistant structure of filling material having no small components and forming the static load bearing layer of the container, the ratio of synthetic resin present in said synthetic concrete relative to the amount of filling material being such that a sufficient wetting of the particles of said filling material is achieved to assure bonding of said particles to one another but without impairing the permeability of said body; and means for monitoring said space and for detecting pressure variations in the same.

2. Storage container according to claim 1 wherein the synthetic resin concrete comprises polyester concrete.

3. Storage container according to claim 2 wherein the filling material structure of the synthetic resin concrete comprises granular, pressure resistant material without small components of less than 1 mm.

4. Storage container according to claim 3, wherein the filling material structure comprises gravel having a grain size of above 2 mm and the resin comprises an unsaturated polyester.

5. Storage container according to claim 1 comprising at least two component shells which are formed with connecting flanges for connecting the shells, wherein these connecting flanges only partially extend into the gap thus leaving a portion of the cross section of the gap unobstructed.

6. Storage container according to claim 5 wherein a strengthening strip is firmly secured to the free portion of the cross section of the gap in the region of the line of the joint.

7. Storage container according to claim 1 having a double curvature, preferably of spherical shape, comprising at least two component shells glued together at their joints, wherein a connecting flange is formed on each upper and lower portion of the inner and outer walls extending into the gap, each pair of connecting flanges leaving a portion of the cross section of the gap unobstructed and having adhesive between them.

8. Storage container according to claim 1, wherein the inner and outer walls comprise rolled laminated rovings, i.e. glass fiber roving layers soaked in polyester resin.

9. Storage container in accordance with claim 1, wherein said synthetic plastic material of said outer and inner walls is a thermosetting resin material.

10. Storage container in accordance with claim 1, wherein said synthetic plastic material of said outer and inner walls is a glass-fiber-reinforced thermosetting resin material.

11. Storage container in accordance with claim 1, wherein said filling material has at most about 5% of small components with a diameter of less than 1 mm.

12. Storage container in accordance with claim 1, wherein said continuous leak monitoring space is at sub-atmospheric pressure and said monitoring means comprises means for detecting pressure variations in said space.

13. A double-walled storage container for fluids such as heating oil which endanger the ground water, comprising
  an inner wall of glass fiber reinforced plastic material;
  an outer wall spaced from the inner wall and comprising synthetic resin-soaked glass fiber rovings;
  the space between said inner wall and said outer wall forming a gap;
  a continuous body of open-pored material permeable to air and liquid filling said gap and bracing the inner wall, against the outer wall,
  said material being synthetic concrete with a compression-resistant structure of filling material having no small components and forming a load bearing layer of the container;
  said inner and outer walls provided with one connecting flange each leaving unobstructed part of the cross-section of said gap and said synthetic concrete;
  a recess formed in said body of material so that liquid penetrating one of said walls and soaking into said permeable material of said body will enter said recess and form a liquid pool therein; and
  means for monitoring the interior of said recess and for detecting the pressure of said pool of liquid in the same.

* * * * *